UNITED STATES PATENT OFFICE.

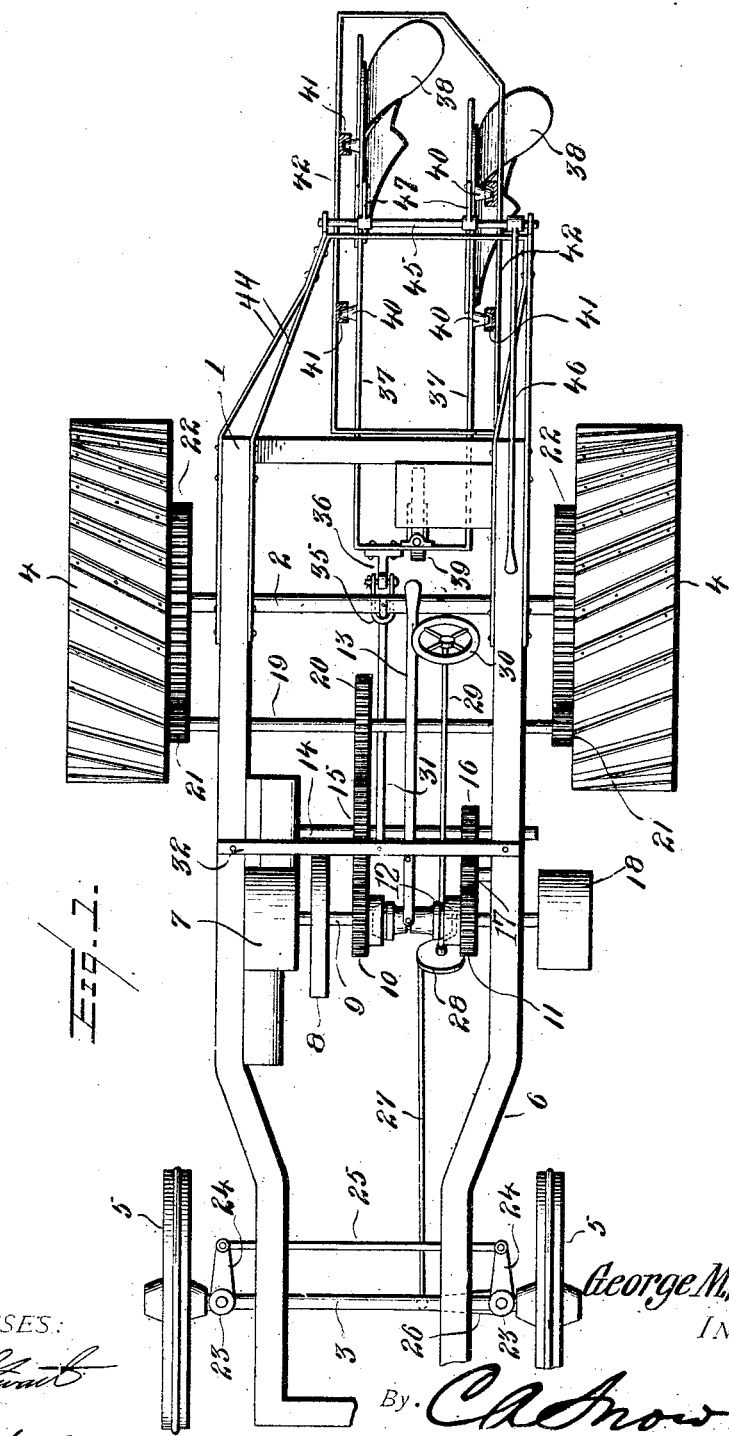

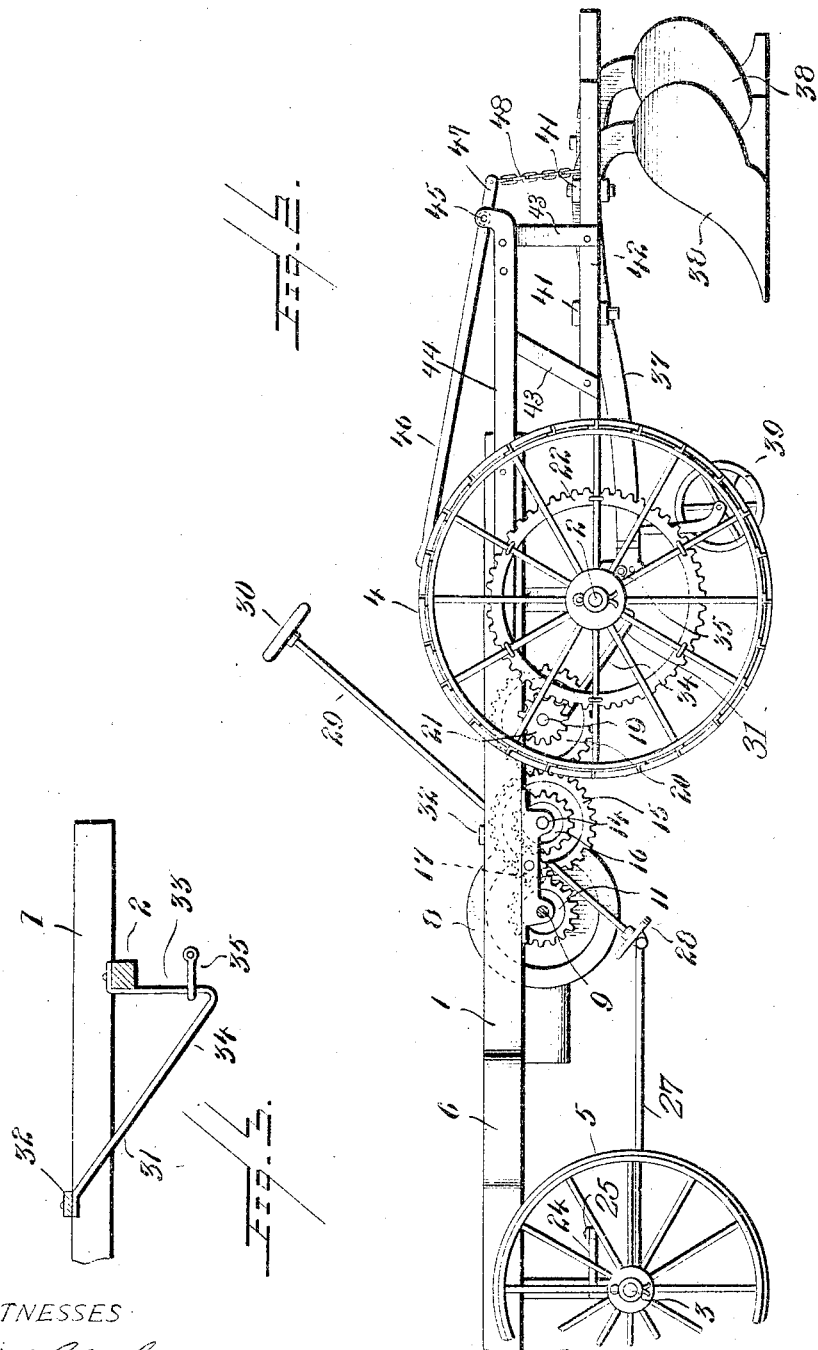

GEORGE M. SHIMP, OF CELINA, OHIO.

MOTOR-PLOW.

No. 877,955.

Specification of Letters Patent.

Patented Feb. 4, 1908.

Application filed November 21, 1906. Serial No. 344,481.

*To all whom it may concern:*

Be it known that I, GEORGE M. SHIMP, a citizen of the United States, residing at Celina, in the county of Mercer and State of Ohio, have invented a new and useful Motor-Plow, of which the following is a specification.

This invention has relation to motor plows and it consists in the novel construction and arrangement of its parts as hereinafter shown and described.

The object of the invention is to provide a plow of the nature indicated which is simple in construction and method of operation. The plow is also constructed in a durable manner and consequently is adapted to withstand rough usage.

The invention consists primarily of a motor upon the frame of which is mounted an engine preferably of the hydrocarbon gas compression type. The shaft of the said engine is connected by a chain of gears and shafts with the traction wheels of the motor. Means is provided for transmitting motion from the engine shaft to the said traction wheels in a forward or rearward direction. Also means is provided for throwing the engine shaft out of gear with the traction wheels. The motor is also provided with a means for steering the same. The frame of the motor is provided with a coupling iron which is formed with a vertical and inclined section and is secured at its ends to the frame. The plow comprises a frame to which is attached plow beams having slight vertical movement with relation to the plow frame. The said beams carry plows of suitable pattern and are supported by ground wheels. A clevis is mounted upon the plow beams for connection with the vertical portion of the said coupling rod. A lever is mounted upon the frame of the motor and is connected with the frame of the plow and is adapted to raise and lower the same.

In the accompanying drawing:—Figure 1 is a top plan view of the plow with parts in section and parts broken away. Fig. 2 is a side elevation of the same with parts in section and parts broken away, and Fig. 3 is a side elevation of the coupling between the motor and the plow.

The motor comprises the frame 1 which is mounted upon the axles 2 and 3. The traction wheels 4 are journaled upon the axle 2 and the steering wheels 5 are pivotally connected with the axle 3. The forward portion of the frame 1 is reduced in lateral dimension as at 6. The engine 7 is mounted upon the frame 1. Said engine is preferably of the hydrocarbon gas compression type, although other forms of engine may be employed. The fly-wheel 8 is fixed to the shaft 9 of the engine 7. The gear wheels 10 and 11 are journaled upon the shaft 9 and a clutch 12 is located between the said gear wheels 10 and 11 and is adapted to engage one or the other of the same. The lever 13 is provided for throwing the clutch 12. The shaft 14 is journaled upon the frame 1 in parallel relation with the shaft 9 and is provided with a gear wheel 15 which meshes with the gear wheel 10. The said gear wheel 15 is loosely mounted upon the shaft 14. The gear wheel 16 is fixed to the shaft 14. The said gear wheel 16 meshes with the pinion 17 which, in turn, meshes with the gear wheel 11. The belt pulley 18 is fixed to the shaft 9. The shaft 19 is journaled upon the frame 1 in parallel relation with the shaft 14 and is provided with the relatively-fixed gear wheel 20 which meshes with the gear wheel 15. The ends of the shaft 19 project beyond the sides of the frame 1 and are provided with the pinions 21 which mesh with the bull rings 22 attached to the inner sides of the traction wheels 4, 4.

The spindles 23 upon which the steering wheels 5 are journaled are pivoted to the ends of the front axle 3 and are adapted to swing in horizontal planes only; each said spindle is provided with a rearwardly-extending lug 24. The rod 25 connects the ends of the said lugs 24 together. One of the spindles 23 is provided with an additional lug 26 which extends substantially in a transverse direction with relation to the frame 1. The rod 27 is secured at one end to the lug 26 and at its other end is eccentrically pivoted to the face of the disk 28. Said disk is mounted for rotation upon the frame 1. The shaft 29 is attached at its lower end to the center of the disk 28 and is provided at its upper end with a hand wheel 30. The coupling iron 31 is attached at its forward end to the cross-bar 32 of the frame 1 and at its rear end to the rear axle 2. Said coupling rod is provided with the rear vertically-extending portion 33 which depends from the axle 2 and the forward inclined portion 34. The clevis link 35 surrounds the portion 33 of the coupling rod 31 and is free to slide vertically thereon. The said link 35 is connected to the clevis 36 which, in turn, is attached to the forward portion of the plow beams 37. The plows 38 are carried by the rear ends of the beams 37 and the ground wheels 39 support the said beams. The beams are provided with laterally extending lugs 40, 40 which are located in the vertically disposed elongated sockets 41. Said sockets 41 are attached to the inner sides of the plow frame 42. The said plow frame 42 is supported by the links 43 which, in turn, are connected to the arms 44 fixed to the frame 1. The shaft 45 is journaled upon the arms 44 and the lever 46 is attached to the same. The shaft 45 is provided with the lugs 47 which are connected by chains 48 with the beams 37.

From the foregoing description it is obvious that as the implement passes over the ground the plows 38, beams 37 and plow frame 42 may be raised or lowered by the manipulation of the lever 46. Also, when the plows are in engagement with the ground they may have slight vertical movement with relation to the plow frame 42 by reason of the lugs 40 working in the vertically-disposed sockets 41. Also, the said plows may have a limited vertical movement with relation to the motor frame 1 by reason of the clevis link 35 moving up and down on the vertical portion 33 of the coupling rod 31. Thus all of the essential movements and adjustments in an implement of the character indicated are provided.

Having described my invention, what I claim as new is:—

A plow for attachment to a traction motor, comprising beams having lugs, a frame having vertically elongated sockets receiving said lugs and extending transversely of the beams, arms for attachment with the motor, links depending from said arms and attaching with the frame, a shaft journaled upon the arms, a lever attached to said shaft, a flexible element connecting the beams with the shaft, a clevis attached to the beams and a coupling rod having a vertical portion passing through the clevis and an adjacent inclined portion.

In testimony that I claim the foregoing as my own, I have hereto affixed my signature in the presence of two witnesses.

GEO. M. SHIMP.

Witnesses:
E. H. FERD,
C. E. MARSH.